March 31, 1925. 1,532,098
E. G. K. ANDERSON
ELECTRIC WIRING CONNECTION AND SUPPORT THEREFOR
Filed April 14, 1922
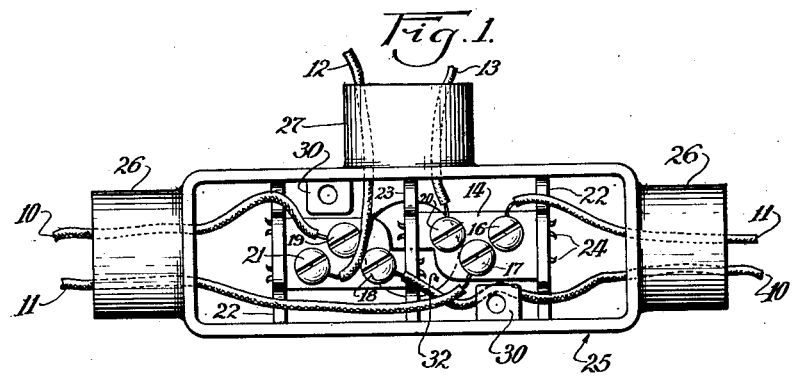
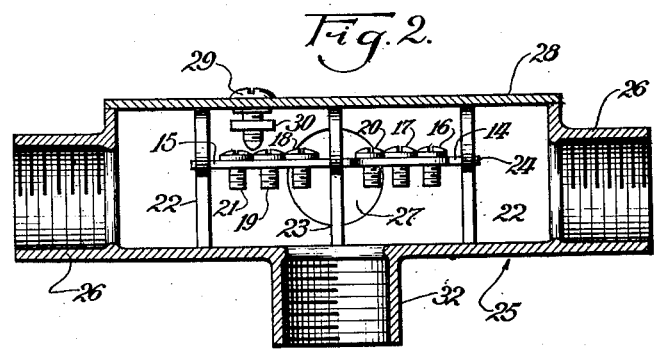
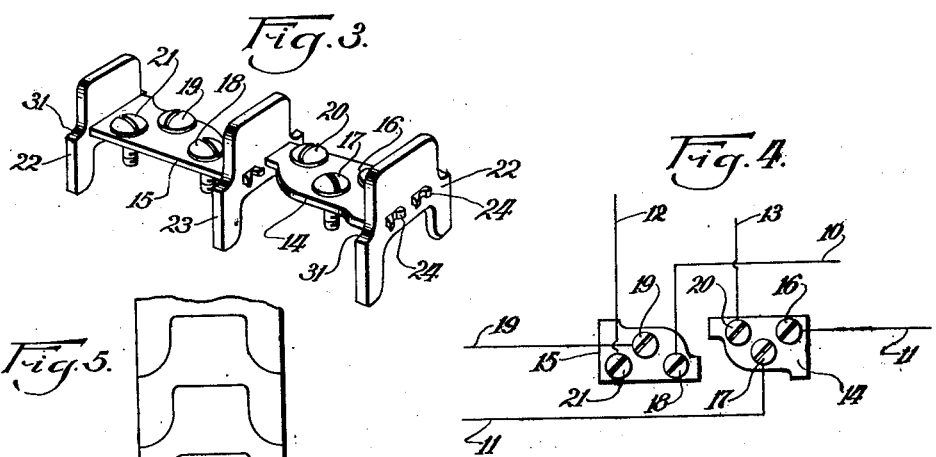
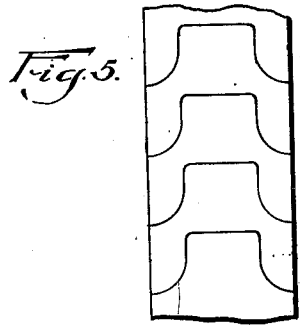
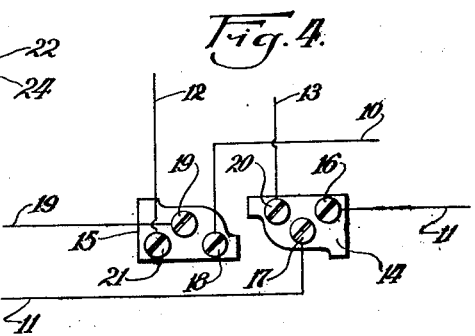
Inventor:
Ernst G. K. Anderson.

Patented Mar. 31, 1925.

1,532,098

UNITED STATES PATENT OFFICE.

ERNST G. K. ANDERSON, OF EVANSTON, ILLINOIS, ASSIGNOR TO APPLETON ELECTRIC CO., OF CHICAGO, ILLINOIS, A CORPORATION OF ILLINOIS.

ELECTRIC WIRING CONNECTION AND SUPPORT THEREFOR.

Application filed April 14, 1922. Serial No. 552,619.

*To all whom it may concern:*

Be it known that I, ERNST G. K. ANDERSON, a citizen of the United States, and a resident of Evanston, in the county of Cook and State of Illinois, have invented certain new and useful Improvements in Electric Wiring Connections and Supports Therefor; and I do hereby declare that the following is a full, clear, and exact description thereof, reference being had to the accompanying drawings, and to the characters of reference marked thereon, which form a part of this specification.

This invention relates to improvements in taps for electric wiring for connecting the wiring of a branch circuit or circuits to the wiring of a main circuit, and refers more specifically to an arrangement of fixed conducting elements having means by which the wires can be readily connected thereto and through them to each other, and to an insulating mounting for the conducting elements, and to means for holding such mounting removably and rigidly in a receptacle into which the wiring leads and at which they are connected.

An object of the invention is to simplify the connection of branch circuit wires to the wires of a main circuit by means which avoid the necessity of stripping the insulation from the main circuit wires for connection to the branch circuit wires and to avoid tapeing the bared wires at the point of connection.

A further object of the invention is to produce a novel assembly of conducting elements and an insulating support therefor, arranged to insulate the conducting elements from each other, to produce a rigid assembly or unit including such conducting elements, which may be readily handled as a whole and which afford ready means for connecting the circuit wires to said conducting elements.

A further object of the invention is to produce an assembled unit of this character which may be removably supported in a receptacle, such as a junction box, in a manner to be fixedly held therein, and by means which permit ready removal of said unit from and its replacement in the receptacle.

Other objects of the invention are to further improve and simplify electric wiring connections and their appurtenances, and the invention consists in the combination and arrangement of the elements shown in the drawings and described in the specification, and is pointed out in the appended claims.

In said drawings:

Figure 1 is a top view of the wiring connections and the receptacle to enclose and support them, with the cover plate removed.

Figure 2 is a horizontal section thereof, with the cover plate in place and with the wiring omitted.

Figure 3 is a perspective view of the conductor element and insulating unit assembly.

Figure 4 is a diagram of the wiring connections.

Figure 5 is a diagram illustrating the manner of cutting the insulating units without waste from a strip of insulating material.

As shown in said drawings, 10, 11 designate the main circuit wires and 12, 13 designate branch circuit wires connected, respectively, to the wires 10 and 11 of the main circuit.

In accordance with my invention the main circuit wires are divided and bared at their ends and are connected to the conducting plates 14, 15, as by means of binding screws 16, 17 and 18, 19, and the bared ends of the branch circuit wires are connected to the same plates by other binding screws 20, 21, as best shown in Figures 1 and 4. Said plates 14 and 15 are supported and are insulated from each other by an insulating unit presently to be described. The binding screws constitute means whereby reliable electric connection is afforded between the members of the main circuit wires and, through said plates, with the branch circuit wires.

The supporting and insulating unit referred to, and constituting a feature of my invention, embraces, in addition to the conducting plates 14, 15, struts or standards 22, 22, and 23, which are made of insulating material. They are provided between their ends with apertures to receive endwise extending split lugs or spurs 24. Said spurs are made of such length as to extend through and beyond the struts, with the squared or flat end edges of the plates abutting against the certain sides of said struts; and said mounting plates are fixed rigidly to said struts by clinching the members of the split lugs outwardly away from each other on the opposite sides of the struts in the manner best shown in Figures 1 and 3. The construction described comprises means for insulating the conducting plates from each other and also means for rigidly connecting the plates and struts to constitute a rigid unitary structure which can be assembled as such, so that all parts of the unitary structure retain their relative positions when handling the same.

In accordance with another phase of the invention the said unitary structure, embracing the conducting plates and the supporting and insulating struts, are so designed as to be inserted in a protecting receptacle, as the junction box, designated in Figures 1 and 2 as a whole by the reference numeral 25. Said junction box or receptacle is shown as made principally of an integral chambered body which is provided with end extensions 26, 26 internally threaded to receive the conduit sections through which are led the main circuit wires 10 and 11, and with a lateral branch or extension 27 internally threaded to receive the conduit section through which are led the wires 12 and 13 of the branch circuit. The said receptacle is provided with a removable cover plate 28 which bridges across and covers an opening at one side of the box, and is fastened to said box by means of screws 29 which extend through apertures in the box and are threaded in interior lugs 30 on the walls of the box.

The said struts of the unitary supporting and insulating structure are of such length that when the cover 28 is fastened in place the struts will be endwise clamped between the one side wall of the box and said cover plate, so as to firmly hold the interior structure from movement in the box and in the central position indicated in Figures 1 and 2. The struts 22, 23 may be provided with shoulders 31 across which the insulated line wires 10 and 11 may be led and supported.

It will be observed that in the stamping operation of the struts, each is provided, not only with the conductor supporting shoulders 31, but with a cut-out or arched portion, said arched portions, when the structure is assembled, as shown in Figure 2, being in axial alinement, and thereby providing a continuous passage from the inlet to the outlet opening of the box or casing. The said box or receptacle may be rigidly fixed to any suitable support, as by means of an internally threaded lateral branch 32 or otherwise.

In assembling the line wires in the connection best illustrated in Figure 4, the ends of the divided wires 10 and 11 are bared and attached to the conducting plate by the binding screws 16, 17, 18, and 19, and the branch wires 12 and 13 are likewise connected to said conducting plates by the binding screws 20 and 21. The connection of the wires to the binding plate can be made when the unitary structure, consisting of the conducting plates and the insulating supports, are outside of the box or casing 25, or while said unitary structure is within said casing or box, but with the cover 28 removed. When the said circuit wires are thus connected the cover plate is fastened over the opening in the wall of the box and, as stated, confines said structure fixedly in place by endwise pressure against the struts 22, 23.

In the construction shown the said conducting elements or plates 14 and 15 are disposed in the same planes and are relatively offset, with their adjacent ends reduced in width. This arrangement makes it possible to employ relatively narrow struts, while maintaining sufficient air insulation between the inner spurs of one plate and the adjacent side edges of the other plate. Moreover, by arranging said plates end to end the binding screws become very accessible for connection of the circuit wires to the plates and their disconnection therefrom.

It will be noted in Figure 5 that the illustrated supports 22, 22, and 23 can be cut from a strip of insulating material without waste, the narrower portions of said supports, to produce the shoulders 31, being material that is cut away between the spaced lugs of said insulating supports.

It is to be understood that changes may be made in the structural details shown within the spirit of the invention as expressed in the appended claims, and it is the intent to broadly claim all of inherent novelty in the structure shown and described.

I claim as my invention:

1. A unitary structure for the purpose set forth, comprising conducting plates disposed end to end, equipped with binding elements for main and branch circuit wires, end and intermediate insulating supports extending transverse to said plates, to which said plates are rigidly secured at their ends, said supports being formed with one end narrowed to provide shoulders upon which the wires may rest.

2. A unitary structure as described comprising a pair of spaced conducting and terminal junction plates disposed end to end, insulating supporting members rigidly connected with the outer ends of said conducting plates and transverse thereto, the opposed ends of said conducting plates being reduced in width and laterally off-set, and a single intermediate insulating supporting member to which the opposed ends of said conducting plates are rigidly connected.

3. A structure of a class set forth, comprising a plurality of insulating members arranged in spaced relation and having lateral conductor supporting shoulders, said members being provided with recesses at one end, combined conductor and terminal junction plates supported by and between said insulating members, and transverse thereto, a receptacle for said insulating and conducting parts having main inlet, outlet and lateral branch openings, the main inlet and outlet openings and the recesses in said insulating members being in axial alinement.

4. In a structure as set forth in claim 3, one of said insulating members extending transversely across the lateral branch opening.

5. A unitary structure as described, comprising a pair of spaced, identically formed combined conducting and terminal junction plates, each having a laterally offset end portion, and said plates being disposed end to end and reversely arranged, so that their offset portions are laterally juxtaposed, a plurality of identically formed slotted insulating supporting members, certain of said members being arranged respectively at the outer ends of said conducting plates, and another of said insulating supporting members being arranged intermediate said conducting plates, and means formed on the ends of each of said plates cooperating with the slots in the supporting members to form a rigid connection therebetween.

6. A unitary, rigid structure for the purpose set forth comprising conducting plates disposed end to end and equipped with binding elements for main and branch circuit wires, and an end and, intermediate, insulating support for and to which said conducting elements are fixed, combined with a receptacle having an opening to receive said structure, and a cover removably fixed to said receptacle over said opening and serving by clamping action on said insulating support between said cover and an opposite receptacle wall to clamp the structure in place in said receptacle.

7. In combination with conducting elements equipped with binding means for main and branch circuit wires, and supporting and insulating members rigidly fixed thereto, a receptacle having an open side to receive said structure and provided with internal, threaded lugs, and a cover applied over said opening and fixed to said receptacle by screws extending through the cover and into said lugs, said cover exerting clamping pressure on said insulating members to clamp the structure in said receptacle.

In witness whereof I claim the foregoing as my invention, I hereunto append my signature this 3d day of April, 1922.

ERNST G. K. ANDERSON.